US012552391B2

(12) United States Patent
Kusakabe (10) Patent No.: US 12,552,391 B2
(45) Date of Patent: Feb. 17, 2026

(54) INFORMATION PROCESSING SYSTEM MOUNTED ON A VEHICLE AND INCLUDING CONNECTED DASHBOARD CAMERA, IN-VEHICLE INFOTAINMENT, MICROPHONE, AND SPEAKER, AND INFORMATION PROCESSING METHOD

(71) Applicant: HONDA MOTOR CO., LTD., Tokyo (JP)

(72) Inventor: Yuichi Kusakabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 18/167,251

(22) Filed: Feb. 10, 2023

(65) Prior Publication Data

US 2023/0294707 A1    Sep. 21, 2023

(30) Foreign Application Priority Data

Mar. 17, 2022 (JP) .................................. 2022-042292
Aug. 24, 2022 (JP) .................................. 2022-133181

(51) Int. Cl.
*B60W 40/08* (2012.01)

(52) U.S. Cl.
CPC ....... *B60W 40/08* (2013.01); *B60W 2040/089* (2013.01); *B60W 2420/403* (2013.01)

(58) Field of Classification Search
CPC .................. B60W 2040/089; B60W 2420/402
See application file for complete search history.

(56) References Cited

U.S. PATENT DOCUMENTS

| 7,440,891 B1 * | 10/2008 | Shozakai ................ G10L 15/20 |
| | | 704/226 |
| 10,170,111 B2 * | 1/2019 | Puranik ............ H04N 21/42202 |
| 2005/0100141 A1 * | 5/2005 | Otagaki .............. H04M 1/2745 |
| | | 379/88.01 |

(Continued)

FOREIGN PATENT DOCUMENTS

| JP | 2012-133209 A | 7/2012 |
| JP | 2019-61624 A | 4/2019 |

(Continued)

OTHER PUBLICATIONS

Japanese Office Action dated Jul. 1, 2025 issued in corresponding Japanese application No. 2022-133181; English machine translation included (9 pages).

(Continued)

*Primary Examiner* — Jess Whittington
(74) *Attorney, Agent, or Firm* — Rankin, Hill & Clark LLP (57) ABSTRACT

An information processing system includes a voice acquisition unit configured to acquire voice, a voice distribution unit configured to input the voice acquired by the voice acquisition unit to a plurality of voice processing units that receive voice and perform processing, a detection unit configured to detect an operation state of at least one of the voice processing units, and a control unit configured to control operation of the voice distribution unit, and in a case where the detection unit detects a predetermined operation state of one of the voice processing units determined in advance, the control unit stops input of the voice to at least part of the other voice processing units.

3 Claims, 5 Drawing Sheets

(56) References Cited

U.S. PATENT DOCUMENTS

| | | | | |
|---|---|---|---|---|
| 2005/0125230 | A1* | 6/2005 | Haas | G10L 15/04 704/E15.04 |
| 2010/0105446 | A1* | 4/2010 | Charlier | H04M 1/6066 455/569.1 |
| 2010/0113034 | A1* | 5/2010 | Ricci | H04M 1/6066 455/563 |
| 2011/0102591 | A1* | 5/2011 | Yoon | H04N 23/667 348/148 |
| 2012/0303215 | A1* | 11/2012 | Kim | B62D 41/00 701/36 |
| 2013/0258149 | A1* | 10/2013 | Choi | H04N 25/704 348/294 |
| 2014/0278394 | A1* | 9/2014 | Bastyr | G10L 21/0208 381/92 |
| 2016/0231830 | A1* | 8/2016 | Nemala | G06F 3/04847 |
| 2018/0350365 | A1* | 12/2018 | Lee | G10L 15/22 |
| 2020/0068400 | A1* | 2/2020 | Ramic | H04L 63/102 |
| 2020/0294502 | A1* | 9/2020 | Kurihara | G10L 15/30 |
| 2020/0320997 | A1* | 10/2020 | Wagatsuma | B60K 35/265 |
| 2020/0338981 | A1* | 10/2020 | Moon | G05D 1/0088 |
| 2021/0183388 | A1* | 6/2021 | Zhao | G10L 15/18 |
| 2021/0358492 | A1* | 11/2021 | Kim | B60W 50/10 |
| 2022/0368554 | A1* | 11/2022 | Williams | H04L 12/1818 |
| 2022/0369034 | A1* | 11/2022 | Kumar | H04R 1/028 |
| 2023/0061646 | A1* | 3/2023 | D'Amico | G06T 3/40 |
| 2023/0386496 | A1* | 11/2023 | Hikima | G10L 21/003 |

FOREIGN PATENT DOCUMENTS

| | | |
|---|---|---|
| JP | 2019-133420 A | 8/2019 |
| JP | 2020-144264 A | 9/2020 |
| JP | 2020-144712 A | 9/2020 |
| JP | 2021-64887 A | 4/2021 |

OTHER PUBLICATIONS

Japanese Office Action Corresponding to JP Application No. 2022-133181, 8 pages.

* cited by examiner

| VOICE PROCESSING UNIT | PRIORITY |
|---|---|
| DASHBOARD CAMERA | 1 |
| CALL PROCESSING UNIT | 2 |
| FIRST AGENT FUNCTIONAL UNIT | 3 |
| SECOND AGENT FUNCTIONAL UNIT | 3 |
| THIRD AGENT FUNCTIONAL UNIT | 3 |

INFORMATION PROCESSING SYSTEM MOUNTED ON A VEHICLE AND INCLUDING CONNECTED DASHBOARD CAMERA, IN-VEHICLE INFOTAINMENT, MICROPHONE, AND SPEAKER, AND INFORMATION PROCESSING METHOD

INCORPORATION BY REFERENCE

The present application claims priority under 35 U.S.C. § 119 to Japanese Patent Application No. 2022-042292 filed on Mar. 17, 2022 and Japanese Patent Application No. 2022-133181 filed on Aug. 24, 2022. The content of the applications is incorporated herein by reference in its entirety.

BACKGROUND OF THE INVENTION

Field of the Invention

The present invention relates to an information processing system and an information processing method.

Description of the Related Art

Japanese Patent Laid-Open No. 2020-144712 discloses an information processing device having a plurality of voice agent functions (voice assistant functions) and a handsfree call function.

A voice agent function is normally activated when voice acquired from a microphone includes a wakeup word that is a predetermined word. Thus, the voice acquired from the microphone is normally always distributed and input to each voice agent functional unit.

Thus, for example, also upon execution of a handsfree call and the like, the voice acquired from the microphone is input to the voice agent functional unit, and in a case where the voice of the call includes a wakeup word, the voice agent functional unit corresponding to the wakeup word can be activated. In this case, content of the call is unintentionally input to the activated voice agent functional unit, which is not desirable in terms of privacy protection.

The present invention is directed to providing an information processing system with improved privacy protection performance.

SUMMARY OF THE INVENTION

One aspect of the present invention is an information processing system including a voice acquisition unit configured to acquire voice, a voice distribution unit configured to input the voice acquired by the voice acquisition unit to a plurality of voice processing units that receive voice and perform processing, a detection unit configured to detect an operation state of at least one of the voice processing units, and a control unit configured to control operation of the voice distribution unit, in which in a case where the detection unit detects a predetermined operation state of one of the voice processing units determined in advance, the control unit stops input of the voice to at least part of the other voice processing units.

According to another aspect of the present invention, at least part of the other voice processing units is an agent functional unit that provides a voice agent service through communication with an external server.

According to still another aspect of the present invention, the one of the voice processing units is a call processing unit that processes a handsfree call, and in a case where start of a handsfree call in the call processing unit is detected, the control unit stops input of the voice to at least part of the other voice processing units.

According to yet another aspect of the present invention, in a case where the call processing unit is executing the handsfree call, the control unit displays information on the voice processing units to which the voice is input from the voice distribution unit on a display device.

According to a further aspect of the present invention, in a case where the call processing unit is executing the handsfree call, the control unit switches ON/OFF of input of the voice from the voice distribution unit for each of the voice processing units in accordance with a switch instruction input from a user.

According to a still further aspect of the present invention, the voice processing units include a voice recording unit configured to record voice in a dashboard camera mounted on a vehicle, and the control unit continues input of the voice from the voice distribution unit to the voice recording unit also in a case where the call processing unit is executing the handsfree call.

A yet further aspect of the present invention is an information processing method to be performed by a computer, the information processing method including a step of acquiring voice, a step of detecting an operation state of at least one of a plurality of voice processing units that receive voice and perform processing, and a step of inputting the voice acquired in the step of acquiring the voice to the voice processing units, and in the step of inputting the voice, in a case where a predetermined operation state of one of the voice processing units determined in advance is detected in the step of detecting the operation state, input of the voice to at least one of the other voice processing units is stopped.

According to the present invention, it is possible to provide an information processing system with improved privacy protection performance.

DETAILED DESCRIPTION OF THE PREFERRED EMBODIMENT

Figure 1:
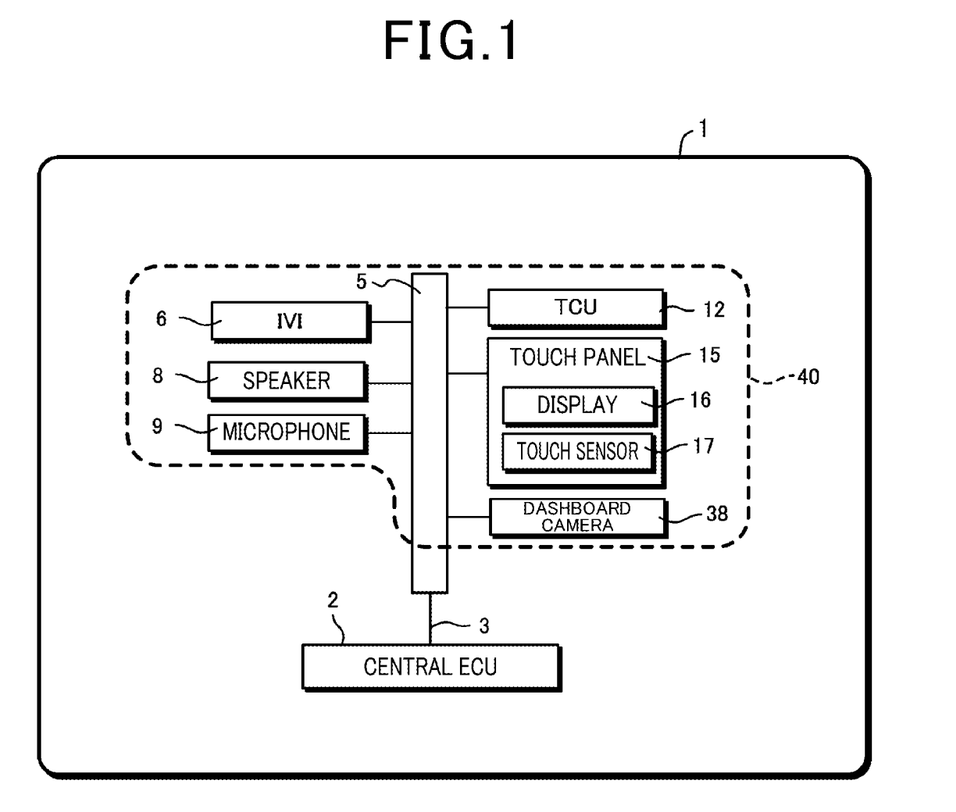
FIG. 1 is a view illustrating a configuration of a control system 1 of a vehicle including an information processing system according to one embodiment of the present invention.

FIG. 1 is a view illustrating a control system 1 of a vehicle.

The control system 1 includes a central ECU 2 (computer) that performs overall control of a vehicle and information processing. The central ECU 2 may have a function of executing over the air (OTA) management. The OTA management includes control regarding processing of downloading an update program of an in-vehicle device provided on the vehicle from a server outside the vehicle and processing of applying the downloaded update program to the in-vehicle device.

The central ECU 2 is connected to a communication line 3. The communication line 3 is constituted with a bus that performs communication compatible with standards such as CAN and Ethernet (registered trademark) or a communication line that performs peer to peer (P2P) communication. Note that the communication line 3 may be constituted with a plurality of communication lines that perform communication compatible with the same standards or a plurality of communication lines that perform communication compatible with different standards.

To the communication line 3, an in-vehicle infotainment (IVI) 6, a speaker 8 and a microphone 9 are connected via an in-vehicle connection link 5. Further, to the in-vehicle connection link 5, a telematics control unit (TCU) 12 and a touch panel 15 are connected. The TCU 12 is a wireless communication device (transmitter/receiver, circuit) compatible with communication standards of a mobile communication system. The touch panel 15 includes a display 16 and a touch sensor 17.

The IVI 6 provides various kinds of information and entertainments to passengers of the vehicle using the speaker 8, the microphone 9, the touch panel 15, and the like.

The in-vehicle connection link 5 is constituted with a plurality of communication transmission paths compatible with various communication standards. The in-vehicle connection link 5 may include, for example, a plurality of network transmission paths. In this case, the plurality of network transmission paths may be connected to each other via a device or the like, having a gateway function. Further, the in-vehicle connection link 5 may include a transmission path for performing P2P communication. As the network transmission paths, various communication buses that perform network communication in conformity with various standards can be employed. While examples of these types of standards can include, for example, CAN, Ethernet, universal serial bus (USB), local interconnect network (LIN) and low voltage differential signaling (LVDS), other standards may be employed.

The control system 1 further includes a dashboard camera 38. The dashboard camera 38 is connected to the in-vehicle connection link 5, acquires voice acquired by the microphone 9 via the IVI 6 and records the acquired voice. Hereinafter, a vehicle on which the control system 1 is mounted will be referred to as an own vehicle, and a user who utilizes the own vehicle will be referred to as a vehicle user.

An information processing system 40 according to the present embodiment includes the IVI 6, the speaker 8, the microphone 9, the TCU 12, the touch panel 15 and the dashboard camera 38 of the control system 1 illustrated in FIG. 1.

Figure 2:
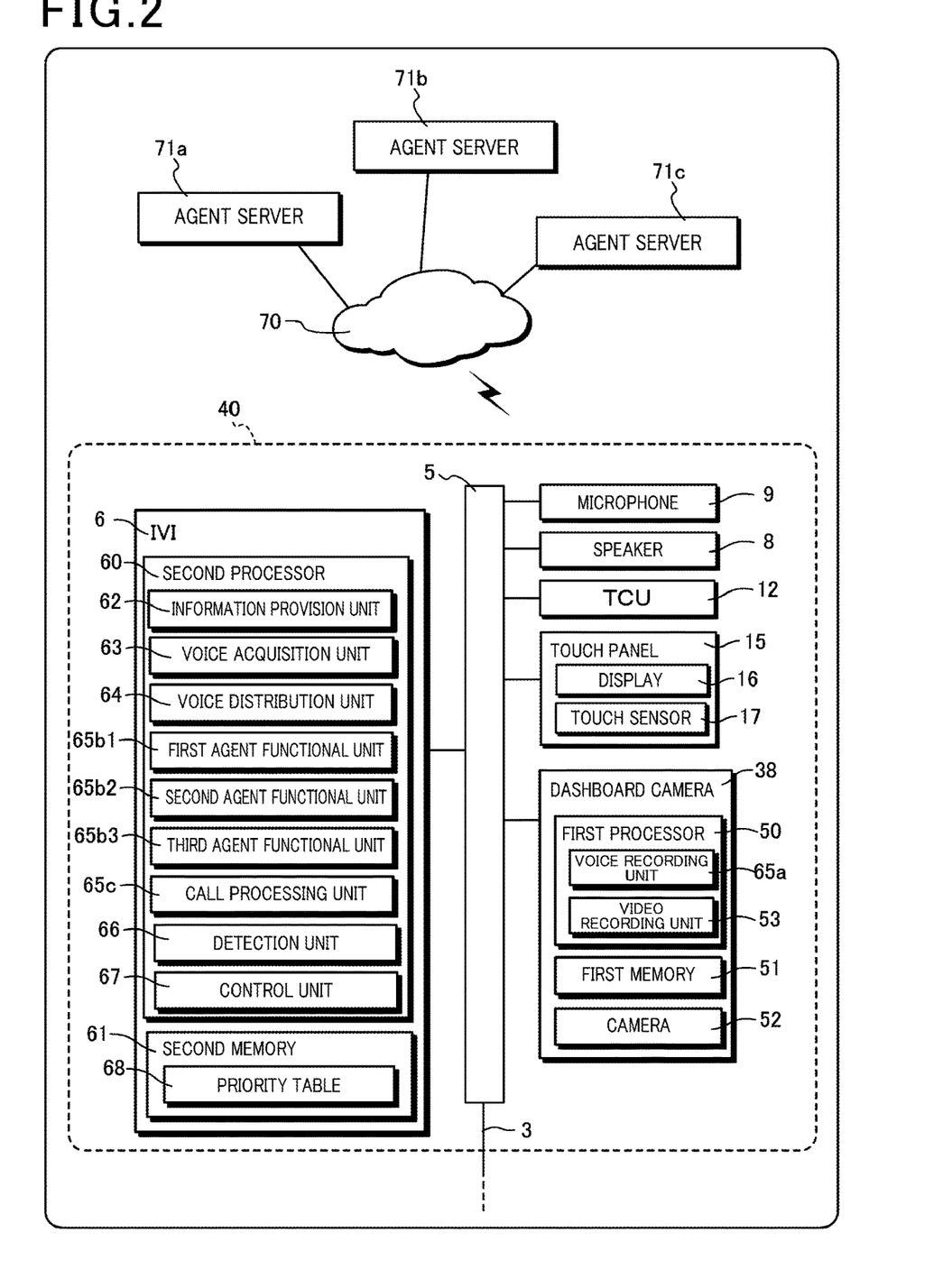
FIG. 2 is a view illustrating a configuration of the information processing system according to one embodiment of the present invention.

FIG. 2 is a view illustrating a configuration of the IVI 6 and the dashboard camera 38 provided in the information processing system 40.

The dashboard camera 38 includes a first processor 50, a first memory 51 and a camera 52. The first memory 51 is constituted with, for example, a volatile and/or non-volatile semiconductor memory. The camera 52 acquires an image of an environment around the own vehicle including an environment ahead of the own vehicle.

The first processor 50 is, for example, a computer including a CPU. The first processor 50 includes a voice recording unit 65a and a video recording unit 53 as functional elements or functional units. These functional elements can be implemented by the first processor 50 which is a computer executing a program. Note that the above-described computer program can be stored in an arbitrary computer-readable storage medium. In place of this, all or some or one of the above-described functional elements provided in the first processor 50 can be constituted with hardware each including one or more electronic circuit parts.

The voice recording unit 65a acquires the voice acquired by the microphone 9 via the IVI 6 and records the voice. Specifically, the voice recording unit 65a stores data of the acquired voice in the first memory 51. Here, the voice recording unit 65a corresponds to one of a plurality of voice processing units that receive voice and perform processing in the present disclosure.

The video recording unit 53 acquires an image of an environment around the own vehicle acquired by the camera 52 as a video. The video recording unit 53 stores data of the acquired video in the first memory 51 in association with the data of the voice acquired by the voice recording unit 65a. By this means, the video recording unit 53 records the image of the environment around the own vehicle.

The IVI 6 also functions as an information processing device that controls distribution of the voice acquired from the microphone 9 as well as provides information and entertainments to passengers of the vehicle.

The IVI 6 includes a second processor 60 and a second memory 61. The second memory 61 is constituted with, for example, a volatile and/or non-volatile semiconductor memory. The second processor 60 is, for example, a computer including a CPU. The second processor 60 includes an information provision unit 62, a voice acquisition unit 63 and a voice distribution unit 64 as functional elements or functional units. Further, the second processor 60 includes a first agent functional unit 65b1, a second agent functional unit 65b2, a third agent functional unit 65b3 and a call processing unit 65c as functional elements or functional units. The second processor 60 further includes a detection unit 66 and a control unit 67 as functional elements or functional units.

These functional elements can be implemented by the second processor 60 which is a computer executing, for example, a program stored in the second memory 61. Note that the above-described computer program can be stored in an arbitrary computer-readable storage medium. In place of this, all or some of the above-described functional elements provided in the second processor 60 can be constituted with hardware each including one or more electronic circuit parts.

Here, the first agent functional unit 65b1, the second agent functional unit 65b2, the third agent functional unit 65b3 and the call processing unit 65c correspond to a plurality of voice processing units that receive voice and perform processing in the present disclosure along with the above-described voice recording unit 65a. Hereinafter, the first agent functional unit 65b1, the second agent functional unit 65b2 and the third agent functional unit 65b3 will be also collectively referred to as an agent functional unit 65b. Further, the voice recording unit 65a, the agent functional unit 65b and the call processing unit 65c will be also collectively referred to as a voice processing unit 65.

The information provision unit 62 provided in the second processor 60 performs communication with various web servers (not illustrated) via a communication network 70 such as the Internet by the TCU 12 in accordance with related art and provides various kinds of information and entertainments to passengers of the own vehicle via the speaker 8, the touch panel 15, and the like. Further, the information provision unit 62, for example, performs communication with a GNSS sensor (not illustrated) to acquire position information of the own vehicle and performs route guidance via the touch panel 15, and the like.

The voice acquisition unit 63 acquires sound within a vehicle interior, including voice of the vehicle user, from the microphone 9.

The voice distribution unit 64 distributes and inputs the voice acquired by the voice acquisition unit 63 into a plurality of voice processing units 65. In the present embodiment, particularly, the voice distribution unit 64 switches ON/OFF of input of the voice to each of the voice processing units 65 under control by the control unit 67, which will be described later. As described above, in the present embodiment, the plurality of voice processing units 65 are the voice recording unit 65*a* of the dashboard camera 38, the first agent functional unit 65*b*1, the second agent functional unit 65*b*2, the third agent functional unit 65*b*3 and the call processing unit 65*c*.

The first agent functional unit 65*b*1, the second agent functional unit 65*b*2 and the third agent functional unit 65*b*3 respectively provide voice agent services to the vehicle user in cooperation with agent servers 71*a*, 71*b* and 71*c* connected so as to be able to perform communication via the TCU 12 and the communication network 70 such as the Internet. Hereinafter, the agent servers 71*a*, 71*b* and 71*c* will be also collectively referred to as an agent server 71. Here, the agent servers 71*a*, 71*b* and 71*c* correspond to external servers in the present disclosure.

The voice agent services, which are also referred to as voice assistant services, refer to functions and services that appropriately respond or execute requested operation in response to a question and a request in a spoken language from the user, for example, by a combination of processing such as voice recognition processing and natural language processing. The agent functional unit 65*b*, for example, functions as a user interface of the voice agent services. Each agent server 71 performs processing such as voice recognition, sentence comprehension, response selection and/or instruction execution for voice input from the corresponding agent functional unit 65*b* and returns a result of the processing to the agent functional unit 65*b*.

The first agent functional unit 65*b*1, the second agent functional unit 65*b*2 and the third agent functional unit 65*b*3 respectively perform voice agent services different from each other in cooperation with the agent servers 71*a*, 71*b* and 71*c* in accordance with related art. For example, the first agent functional unit 65*b*1, the second agent functional unit 65*b*2 and the third agent functional unit 65*b*3 respectively provide services of Google assistant (registered trademark), Alexa (registered trademark) and CarPlay (registered trademark) as the voice agent services.

In the voice agent services provided by the first agent functional unit 65*b*1, the second agent functional unit 65*b*2 and the third agent functional unit 65*b*3, wakeup words different from each other are defined. By the vehicle user producing a sound of the wakeup word of the voice agent service that the vehicle user desires to utilize, the agent functional unit 65*b* corresponding to the voice agent service starts processing of the voice agent function.

The call processing unit 65*c* provides a telephone function by a handsfree call to the vehicle user in cooperation with the speaker 8, the microphone 9 and the TCU 12 in accordance with related art. In the present embodiment, particularly, the call processing unit 65*c* acquires voice of a call of the vehicle user acquired by the microphone 9 via the voice acquisition unit 63 and the voice distribution unit 64 and performs processing of a handsfree call.

The detection unit 66 detects an operation state of at least one of the voice processing units 65 among the voice recording unit 65*a* of the dashboard camera 38, the first agent functional unit 65*b*1, the second agent functional unit 65*b*2, the third agent functional unit 65*b*3 and the call processing unit 65*c*. Here, the operation state can include a state where voice recording is executed and a state where voice recording is stopped for the voice recording unit 65*a* of the dashboard camera 38. Further, the above-described operation state for the agent functional unit 65*b* can include a state of waiting for reception of a wakeup word and a state where the voice agent service is executed after the wakeup word is received. Still further, the above-described operation state for the call processing unit 65*c* can include a calling state and a call waiting state.

The control unit 67 controls operation of the voice distribution unit 64 on the basis of the operation state of the voice processing unit 65 detected by the detection unit 66. In the present embodiment, particularly, when the detection unit 66 detects a predetermined operation state of one of the voice processing units 65 determined in advance, the control unit 67 stops input of voice to at least part of the other voice processing units 65. Here, at least part of the other voice processing units 65 can include at least part of the agent functional unit 65*b* that provides voice agent services.

Specifically, when the detection unit 66 detects start of a call at the call processing unit 65*c*, that is, start of a calling state, the control unit 67 instructs the voice distribution unit 64 to stop input of voice to the first agent functional unit 65*b*1, the second agent functional unit 65*b*2 and the third agent functional unit 65*b*3. Thus, in the information processing system 40, even in a case where voice of a call of the user in a handsfree call provided by the call processing unit 65*c* includes one of the above-described wakeup words, it is possible to prevent the corresponding agent functional unit 65*b* from starting processing and the user voice from being transmitted outside the vehicle. By this means, in the information processing system 40, it is possible to improve privacy protection performance.

Further, in the present embodiment, even in a case where the detection unit 66 detects start and continuation of the calling state in the call processing unit 65*c*, the control unit 67 instructs the voice distribution unit 64 to continue input of voice to the voice recording unit 65*a* of the dashboard camera 38. By this means, in the information processing system 40, for the dashboard camera 38 for which constant voice recording is required, voice recording can be constantly executed even during a handsfree call.

Figure 3:
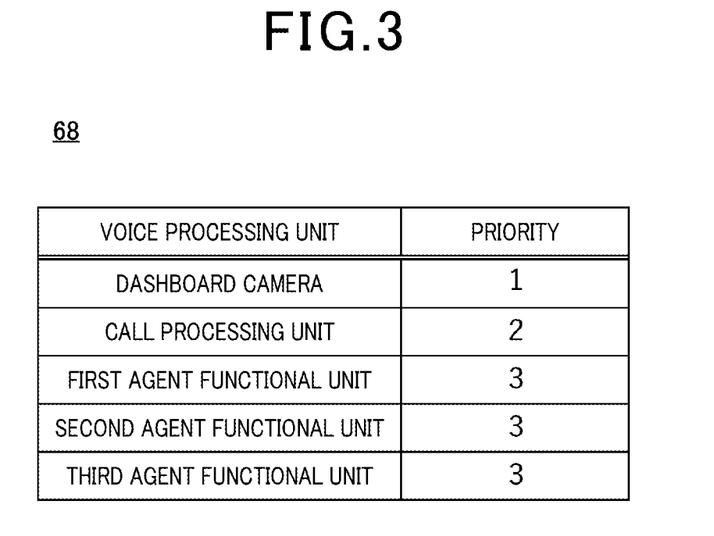
FIG. 3 is a view illustrating an example of a priority table.

For example, when operation of one of the voice processing units 65 is started, the control unit 67 can specify the other voice processing units 65 to which voice input should be stopped on the basis of a priority table 68 stored in the second memory 61 in advance. FIG. 3 is a view illustrating an example of the priority table 68. FIG. 3 indicates priority of the voice recording unit 65*a* of the dashboard camera 38 on the first line except a title line on the top line and indicates priority of the call processing unit 65*c* on the second line. Further, FIG. 3 indicates priority of the three agent functional units of the first agent functional unit 65*b*1, the second agent functional unit 65*b*2 and the third agent functional unit 65*b*3 respectively on the third to the fifth lines.

In the example indicated in FIG. 3, the highest priority of "1" is assigned to the voice recording unit 65*a* of the dashboard camera 38, and the second highest priority of "2" is assigned to the call processing unit 65*c*. Further, the same priority of "3" is assigned to each of the three agent functional units 65*b*.

In a case where the detection unit 66 detects start of operation of one of the voice processing units 65, the control unit 67 specifies priority assigned to the voice processing unit 65 that starts operation with reference to the priority table 68 and instructs the voice distribution unit 64 to stop input of voice to the voice processing units 65 to which priority which is equal to or lower than the specified priority is assigned. By this means, in a case where, for example, the detection unit 66 detects start of operation of the first agent functional unit 65b1, the control unit 67 instructs the voice distribution unit 64 to stop input of voice to other second agent functional unit 65b2 and third agent functional unit 65b3, in addition to the above-described operation.

Figure 4:
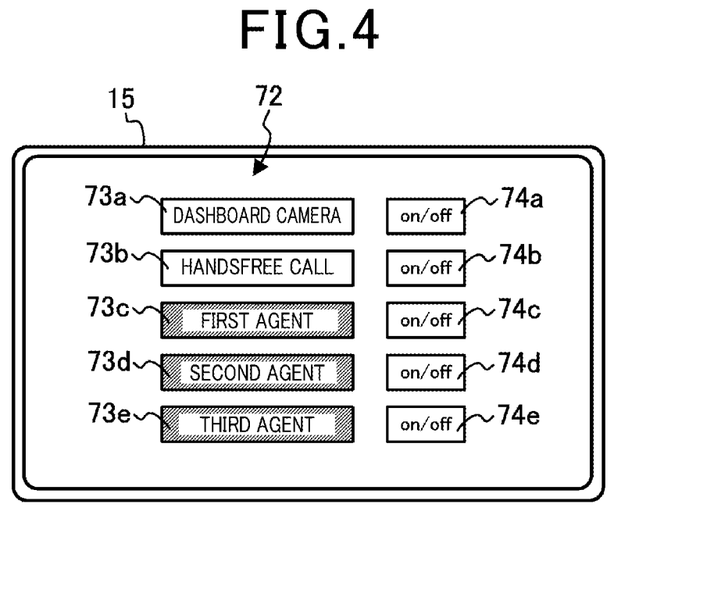
FIG. 4 is a view illustrating an example of a voice input information screen.

Further, in a case where the call processing unit 65c executes call processing, the control unit 67 displays information on the voice processing unit 65 to which voice is input from the voice distribution unit on the touch panel 15 which is a display device. FIG. 4 is a view illustrating an example of a voice input information screen to be displayed on the display 16 of the touch panel 15 by the control unit 67.

On a voice input information screen 72 illustrated in FIG. 4, labels 73a, 73b, 73c, 73d and 73e with "dashboard camera", "handsfree call", "first agent", "second agent" and "third agent" respectively corresponding to the voice recording unit 65a of the dashboard camera 38, the call processing unit 65c, the first agent functional unit 65b1, the second agent functional unit 65b2 and the third agent functional unit 65b3 are displayed. Further, labels 73c, 73d and 73e respectively corresponding to the first agent functional unit 65b1, the second agent functional unit 65b2 and the third agent functional unit 65b3 to which voice is not currently input from the voice distribution unit 64 are, for example, grayed out (displayed with ruled lines in the drawing).

This makes it possible for the vehicle user to confirm an input state of voice to each of the voice processing units 65, so that the vehicle user can make a call at ease without minding leakage of the call to outside the vehicle.

Further, on the voice input information screen 72 illustrated in FIG. 4, buttons 74a, 74b, 74c, 74d and 74e for switching states of voice input from the voice distribution unit 64 to the corresponding voice processing units 65 are displayed respectively on the right side in the drawing of the labels 73a, 73b, 73c, 73d and 73e. The vehicle user can input a switch instruction to switch ON/OFF of voice input to the corresponding voice processing units 65 by operating these buttons.

By this means, when the call processing unit 65c is executing call processing, the control unit 67 can switch ON/OFF of voice input from the voice distribution unit 64 for each of the voice processing units 65 in accordance with the above-described switch instruction input from the vehicle user. For example, in a case where the vehicle user desires to utilize one of the voice agent services during execution of handsfree call, the vehicle user can temporarily mute a handsfree call and turn on input of voice to a desired agent functional unit 65b through a switch instruction using the above-described buttons.

Figure 5:
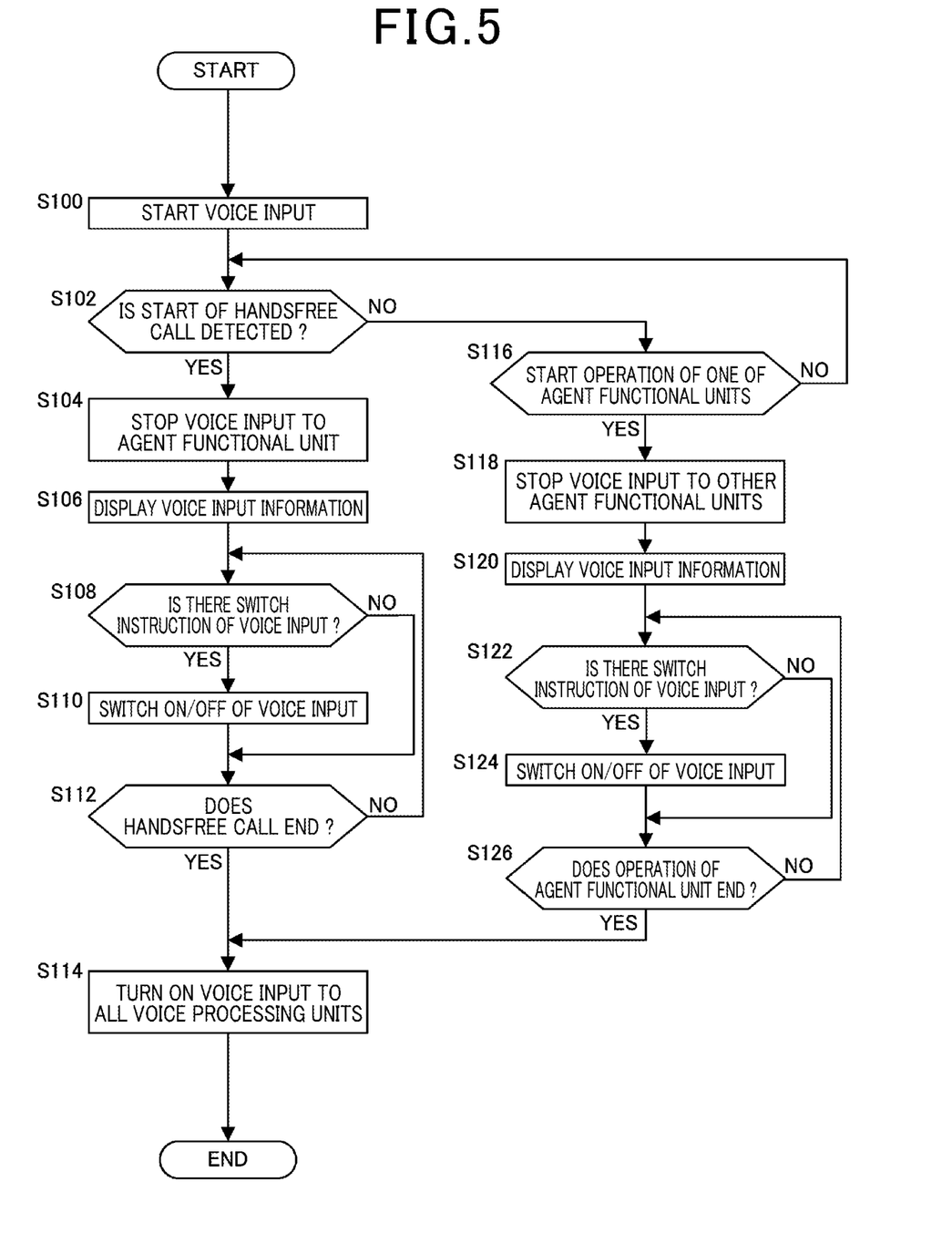
FIG. 5 is a flowchart illustrating procedure of voice distribution processing in the information processing system.

Next, procedure of operation of voice distribution from the voice acquisition unit 63 to the voice processing unit 65 in the information processing system 40 will be described. FIG. 5 is a flowchart illustrating procedure of voice distribution processing in the information processing system 40. The processing in FIG. 5 is repeatedly executed.

If the processing is started, first, the voice distribution unit 64 starts input of voice acquired by the voice acquisition unit 63 from the microphone 9 to the voice processing unit 65 (S100). Then, the detection unit 66 determines whether or not start of a handsfree call in the call processing unit 65c is detected (S102). Then, in a case where start of a call is detected (S102: Yes), the control unit 67 stops input of voice to the agent functional unit 65b with priority equal to or less than priority assigned to the call processing unit 65c with reference to the priority table 68 (S104). The voice input is stopped by the control unit 67 instructing the voice distribution unit 64.

Then, the control unit 67 displays voice input information which is information of the voice processing unit 65 to which voice is input from the voice distribution unit on the touch panel 15 (S106). This display is, for example, performed by the control unit 67 displaying the voice input information screen 72 as illustrated in FIG. 4 on the touch panel 15.

Then, the control unit 67 determines whether or not a switch instruction is input from the vehicle user for the voice input (S108). Input of this switch instruction can be performed by, for example, operation of the buttons 74a, 74b, 74c, 74d and 74e on the voice input information screen 72 illustrated in FIG. 4. Then, in a case where the switch instruction is input in step S108 (S108: Yes), the control unit 67 switches ON/OFF of input of voice to the corresponding voice processing unit 65 in accordance with the input switch instruction (S110).

Subsequently, the detection unit 66 determines whether or not the call ends (S112). In a case where the call ends (S112: Yes), the control unit 67 turns on voice input to all the voice processing units 65 (S114) and ends the processing.

On the other hand, in a case where the switch instruction is not input in step S108 (S108: No), the processing transitions to step S112. Further, on the other hand, in a case where the call does not end in step S112 (S112: No), the detection unit 66 returns the processing to step S108.

On the other hand, in a case where start of handsfree call is not detected in step S102 (S102: No), the detection unit 66 determines whether or not start of operation of one of the agent functional units 65b is detected (S116). Then, in a case where operation of the agent functional unit 65b is not started (S116: No), the detection unit 66 returns the processing to step S102 and repeats the processing.

On the other hand, in a case where operation of one of the agent functional units 65b is started (S116: Yes), the control unit 67 stops input of voice to the other agent functional units 65b with reference to the priority table 68 (S118).

Then, the control unit 67 displays voice input information which is information on the voice processing unit 65 to which voice is input from the voice distribution unit 64 on the touch panel 15 (S120). Then, the control unit 67 determines whether or not a switch instruction for the voice input is input from the vehicle user (S122). Then, in a case where the switch instruction is input (S122: Yes), the control unit 67 switches ON/OFF of voice input to the corresponding voice processing unit 65 in accordance with the input switch instruction (S124).

Subsequently, the detection unit 66 determines whether or not operation in the agent functional unit 65b, the operation being started in step S116, ends (S126). Then, in a case where the above-described operation ends (S126: Yes), the control unit 67 shifts the processing to step S114.

On the other hand, in a case where the switch instruction is not input in step S122 (S122: No), the processing transitions to step S126. Further, on the other hand, in a case where the operation in the agent functional unit 65b, the operation being started in step S116, does not end in step S126 (S126: No), the detection unit 66 returns the processing to step S122.

Note that the present invention is not limited to the configuration of the above-described embodiment and can be implemented in various aspects within a range not deviating from the gist.

Configuration Supported by the Above-Described Embodiment

The above-described embodiment supports the following configurations.

Configuration 1

An information processing system including a voice acquisition unit configured to acquire voice, a voice distribution unit configured to input the voice acquired by the voice acquisition unit to a plurality of voice processing units that receive voice and perform processing, a detection unit configured to detect an operation state of at least one of the voice processing units, and a control unit configured to control operation of the voice distribution unit, in which in a case where the detection unit detects a predetermined operation state of one of the voice processing units determined in advance, the control unit stops input of the voice to at least part of the other voice processing units.

According to the information processing system of the configuration 1, when one of the voice processing units starts operation, voice is prevented from being unintentionally input to the other voice processing units, so that it is possible to improve privacy protection performance as the information processing system.

Configuration 2

The information processing system according to the configuration 1, in which at least part of the other voice processing units is an agent functional unit that provides a voice agent service through communication with an external server.

According to the information processing system of the configuration 2, for example, it is possible to prevent user voice from being unintentionally leaked to an agent server outside the vehicle.

Configuration 3

The information processing system according to the configuration 1 or 2, in which the one of the voice processing units is a call processing unit that processes a handsfree call, and in a case where start of a handsfree call in the call processing unit is detected, the control unit stops input of the voice to at least part of the other voice processing units.

According to the information processing system of the configuration 3, it is possible to prevent a private call of the vehicle user upon phone use from being unintentionally leaked outside the vehicle.

Configuration 4

The information processing system according to the configuration 3, in which in a case where the call processing unit is executing the handsfree call, the control unit displays information on the voice processing units to which the voice is input from the voice distribution unit on a display device.

According to the information processing system of the configuration 4, the vehicle user can confirm input states of voice to the respective voice processing units, so that the vehicle user can make a call at ease without minding leakage of the call to outside.

Configuration 5

The information processing system according to the configuration 3 or 4, in which in a case where the call processing unit is executing the handsfree call, the control unit switches ON/OFF of input of the voice from the voice distribution unit for each of the voice processing units in accordance with a switch instruction input from a user.

According to the information processing system of the configuration 5, the vehicle user can, for example, utilize a desired voice agent service at a desired timing even during execution of the handsfree call.

Configuration 6

The information processing system according to any one of the configurations 3 to 5, in which the voice processing unit includes a voice recording unit configured to record voice in a dashboard camera mounted on a vehicle, and the control unit continues input of the voice from the voice distribution unit to the voice recording unit also in a case where the call processing unit is executing the handsfree call.

According to the information processing system of the configuration 6, it is possible to cause the dashboard camera for which constant voice recording is required to constantly execute voice recording even during a handsfree call.

Configuration 7

An information processing method to be performed by a computer, the information processing method including a step of acquiring voice, a step of detecting an operation state of at least one of a plurality of voice processing units that receive voice and perform processing, and a step of inputting the voice acquired in the step of acquiring the voice to the voice processing units, in which in the step of inputting the voice, in a case where a predetermined operation state of one of the voice processing units determined in advance is detected in the step of detecting the operation state, input of the voice to at least part of the other voice processing units is stopped.

According to the information processing method of the configuration 7, in a case where one of the voice processing units starts operation, voice is prevented from being unintentionally input to the other voice processing units, so that it is possible to improve privacy protection performance as the information processing system.

REFERENCE SIGNS LIST 1 control system
2 central ECU
3 communication line
5 in-vehicle connection link
6 IVI
8 speaker
9 microphone
12 TCU
15 touch panel
16 display 17 touch sensor
38 dashboard camera
40 information processing system
50 first processor
51 first memory
52 camera
53 video recording unit
60 second processor
61 second memory
62 information provision unit
63 voice acquisition unit
64 voice distribution unit
65 voice processing unit
65a voice recording unit
65b agent functional unit
65b1 first agent functional unit
65b2 second agent functional unit
65b3 third agent functional unit
65c call processing unit
66 detection unit
67 control unit
68 priority table
70 communication network
71, 71a, 71b, 71c agent server
72 voice input information screen
73a, 73b, 73c, 73d and 73e label
74a, 74b, 74c, 74d and 74e button

What is claimed is:

1. An information processing system mounted on a vehicle comprising:
   a dashboard camera, an IVI (in-vehicle infotainment) providing information and entertainment to a passenger of the vehicle, a microphone, and a speaker that are connected via a communication line,
   wherein the dashboard camera includes a first processor, a first memory, and a camera,
   wherein the IVI includes a second processor,
   wherein the second processor:
      acquires voice from the microphone and controls distribution of the voice acquired; and
      performs following functions:
         a function of inputting the voice acquired to the dashboard camera continuously;
         a function of cooperating with an external server communicably connected via a communication network to provide a voice agent service based on the voice acquired to the passenger of the vehicle; and
         a function of providing a telephone function in cooperation with the speaker and the microphone to allow the passenger of the vehicle to make a hands-free call using the voice, and while performing the function of providing the telephone function, stops the function to provide the voice agent service and continues inputting the voice to the dashboard camera, and
   wherein the first processor constantly executes recording the voice obtained from the IVI and stores an image of an environment around the vehicle acquired by the camera as a video in the first memory in association with the voice obtained.

2. The information processing system according to claim 1,
   wherein, when the second processor performs the function of providing the telephone function, the second processor switches ON/OFF of input of the voice to each of the functions in accordance with a switch instruction input from a user.

3. An information processing method to be performed by a computer mounted on a vehicle, wherein the information processing method comprising:
   communicating, via a communication line, with a dashboard camera, an IVI (in-vehicle infotainment) providing information and entertainment to a passenger of the vehicle, and a microphone that are mounted on the vehicle;
   acquiring voice from the microphone and controlling distribution of the voice acquired;
   performing following functions:
      a function of continuously obtaining the voice and constantly executing recording the voice obtained and storing an image of an environment around the vehicle acquired by the camera as a video in a memory in association with the voice obtained;
      a function of cooperating with an external server communicably connected via a communication network to provide a voice agent service based on the voice acquired to the passenger of the vehicle; and
      a function of providing a telephone function in cooperation with the speaker, and the microphone to allow the passenger of the vehicle to make a hands-free call using the voice, wherein while performing the function of providing the telephone function, stopping the function to provide the voice agent service and continuing acquiring the voice from the microphone.

* * * * *